US011448519B2

United States Patent
Du et al.

(10) Patent No.: US 11,448,519 B2
(45) Date of Patent: Sep. 20, 2022

(54) METHOD, APPARATUS, ELECTRONIC DEVICE AND STORAGE MEDIUM FOR DISPLAYING AR NAVIGATION

(71) Applicant: Apollo Intelligent Connectivity (Beijing) Technology Co., Ltd., Beijing (CN)

(72) Inventors: Youhua Du, Shenzhen (CN); Zhipeng Zhou, Shenzhen (CN); Ruibing Ma, Shenzhen (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 68 days.

(21) Appl. No.: 16/917,277

(22) Filed: Jun. 30, 2020

(65) Prior Publication Data

US 2021/0180975 A1    Jun. 17, 2021

(30) Foreign Application Priority Data

Dec. 17, 2019   (CN) .......................... 201911303912.5

(51) Int. Cl.
*G01C 21/36*   (2006.01)
*G06V 20/20*   (2022.01)

(52) U.S. Cl.
CPC ......... *G01C 21/3647* (2013.01); *G06V 20/20* (2022.01)

(58) Field of Classification Search
CPC ............... G06T 19/006; G01C 21/365; G01C 21/3647; G01C 21/3632
See application file for complete search history.

(56) References Cited

U.S. PATENT DOCUMENTS 10,282,915 B1 *   5/2019   Lin .................... G01C 21/3647
10,488,215 B1 *   11/2019   Yu ..................... G01C 21/3647
(Continued)

FOREIGN PATENT DOCUMENTS

CN   102818571 A   12/2012
CN   105929539 A   9/2016
(Continued)

OTHER PUBLICATIONS

Office Action of Japanese Patent Application No. 2020-109650—3 pages (dated Jun. 22, 2021).
(Continued)

*Primary Examiner* — Ryan Rink
(74) *Attorney, Agent, or Firm* — Knobbe Martens Olson & Bear LLP (57) ABSTRACT

A method, an apparatus, an electronic device and a storage medium for displaying an AR navigation are provided. The method may include: recognizing a navigation scene at a current moment during an AR navigation; determining, according to a preset mapping relationship between a navigation scene and a service function, a current service function corresponding to the navigation scene at the current moment; and displaying the current service function corresponding to the navigation scene at the current moment in the navigation scene at the current moment. According to embodiments of the present disclosure, different service functions may be flexibly displayed for different navigation scenes. Therefore, a multi-channel output in the different navigation scenes may be realized, thus saving maintenance time and a maintenance cost.

9 Claims, 5 Drawing Sheets

(56) References Cited

U.S. PATENT DOCUMENTS

| | | | | |
|---|---|---|---|---|
| 2013/0162644 | A1* | 6/2013 | Velkavrh | G06T 19/006 |
| | | | | 345/423 |
| 2013/0187952 | A1* | 7/2013 | Berkovich | G06T 19/006 |
| | | | | 345/633 |
| 2013/0286206 | A1* | 10/2013 | Ozaki | H04N 7/18 |
| | | | | 348/148 |
| 2017/0006108 | A1* | 1/2017 | Deng | H04L 67/12 |
| 2017/0187963 | A1* | 6/2017 | Lee | H04N 5/23218 |
| 2018/0164114 | A1* | 6/2018 | Chiu | G06F 3/04817 |
| 2019/0018250 | A1* | 1/2019 | Kasazumi | G02B 27/0179 |
| 2019/0095729 | A1 | 3/2019 | Dai et al. | |
| 2021/0019867 | A1* | 1/2021 | Hayashi | G06F 3/011 |

FOREIGN PATENT DOCUMENTS

| | | |
|---|---|---|
| CN | 105988582 A | 10/2016 |
| CN | 106915302 A | 7/2017 |
| CN | 107128313 A | 9/2017 |
| CN | 107369207 A | 11/2017 |
| CN | 107627961 A | 1/2018 |
| CN | 108556740 A | 9/2018 |
| CN | 108955714 A | 12/2018 |
| CN | 109050401 A | 12/2018 |
| CN | 109050405 A | 12/2018 |
| CN | 109883414 A | 6/2019 |
| CN | 110441906 A | 11/2019 |
| EP | 3184365 A2 | 6/2017 |
| JP | 2007-114294 A | 5/2007 |
| JP | 2018-137523 A | 8/2018 |
| KR | 10-2012-0067854 A | 6/2012 |

OTHER PUBLICATIONS

"The Future of Augmented Reality (AR) in Cars", PLATFORM, from <https://plat4m.medium.com/the-future-of-augmented-realtiy-air-in-cars-788933212aa9>—7 pages (Nov. 28, 2019).

Office Action in Chinese Application No. 201911303912.5 dated Apr. 16, 2021 in 13 pages.

Office Action in Chinese Application No. 201911303912.5 dated Nov. 30, 2021 in 12 pages.

* cited by examiner

METHOD, APPARATUS, ELECTRONIC DEVICE AND STORAGE MEDIUM FOR DISPLAYING AR NAVIGATION

CROSS-REFERENCE TO RELATED APPLICATIONS

This application claims priority to Chinese Patent Application No. 201911303912.5, filed on Dec. 17, 2019, titled "Method, Apparatus, Electronic Device and Storage Medium for Displaying AR Navigation," which is hereby incorporated by reference in its entirety.

TECHNICAL FIELD

The present disclosure relates to the field of image processing technology, further to the computer vision technology, and particularly to a method, an apparatus, an electronic device and a storage medium for displaying an augmented reality (AR) navigation.

BACKGROUND

In the AR navigation, a video real-scene layer, an AR layer (an induction panel, a lane line, a POI, an early-warning prompt, a turn prompt, etc.) are displayed on a same device. However, according to a service requirement, a specific AR layer needs to be displayed on a specific device to satisfy a service function requirement, user personalized experience, and product function presentation. In the existing technology, there are several obvious problems: (1) in a case where the scene requirement changes, a plurality of modifications and adjustments for codes are involved, resulting in a high maintenance difficulty and a high maintenance cost; and (2) the scalability is poor, that is, when a new scene is added, it is difficult to extend the new scene when the new scene is in conflict with the original scene.

SUMMARY

In view of the above, a method, an apparatus, an electronic device and a storage medium for displaying AR navigation are provided according to embodiments of the disclosure, and thus, different service functions may be flexibly displayed for different navigation scenes. Accordingly, a multi-channel output in the different navigation scenes may be realized, thus saving the maintenance time and the maintenance cost.

According to a first aspect, embodiments of the present disclosure provide a method for displaying an AR navigation. The method may includes:

recognizing a navigation scene at a current moment during an AR navigation;

determining, according to a preset mapping relationship between a navigation scene and a service function, a current service function corresponding to the navigation scene at the current moment; and displaying the current service function corresponding to the navigation scene at the current moment in the navigation scene at the current moment.

The above embodiments have the following advantages or beneficial effects. According to the present disclosure, a mapping relationship between a navigation scene and a service function is preset, such that different functions may be displayed for different navigation scenes in real time. Thus, a multi-channel output in the different navigation scenes may be realized, thus saving the maintenance time and the maintenance cost.

In some embodiments, the determining, according to a preset mapping relationship between a navigation scene and a service function, a current service function corresponding to the navigation scene at the current moment includes:

determining, according to a preset mapping relationship between the navigation scene and a display device, a current display device corresponding to the navigation scene at the current moment;

determining, according to a preset mapping relationship between the display device and an AR layer, a current AR layer corresponding to the current display device;

determining, according to a preset mapping relationship between the AR layer and the service function, the current service function corresponding to the current AR layer.

The above embodiments have the following advantages or beneficial effects. According to the present disclosure, the mapping relationship between the navigation scene and the display device, the mapping relationship between the display device and the AR layer, and the mapping relationship between the AR layer and the service function are preset, and in this way, after the navigation scene at the current moment is recognized, the current display device corresponding to the navigation scene at the current moment may be first determined according to the preset mapping relationship between the navigation scene and the display device. Then, the current AR layer corresponding to the current display device according to the preset mapping relationship between the display device and the AR layer. Next, the current service function corresponding to the current AR layer is determined according to the preset mapping relationship between the AR layer and the service function.

In the above embodiments, before the recognizing a navigation scene at a current moment during AR navigation, the method further includes:

acquiring each display device supported by a current system; and assigning a corresponding root layout to each acquired display device; and adding the root layout corresponding to each display device to the display device.

The above embodiments have the following advantages or beneficial effects. Since different systems may support different display devices, the present disclosure may first acquire each display device supported by the current system, and then assign the corresponding root layout to acquired each display device; and add the root layout corresponding to each display device to the display device. If a certain display device is not supported by the current system, for the display device, a corresponding root layout may not be assigned.

In some embodiments, the method further includes:

dissolving, in response to the navigation scene at the current moment being switched from a first navigation scene to a second navigation scene, a mapping relationship between a first AR layer corresponding to the first navigation scene and a first display device corresponding to the first navigation scene; and establishing a mapping relationship between a second AR layer corresponding to the second navigation scene and a second display device corresponding to the second navigation scene.

The above embodiments have the following advantages or beneficial effects. During the AR navigation, a navigation scene may change at any time, and thus may be switched from the first navigation scene to the second navigation scene. Using the technical scheme provided in the present disclosure, if the navigation scene at the current moment is switched from the first navigation scene to the second navigation scene, the mapping relationship between the first AR layer corresponding to the first navigation scene and the first display device corresponding to the first navigation scene is dissolved, and the mapping relationship between the second AR layer corresponding to the second navigation scene and the second display device corresponding to the second navigation scene is established. That is, the present disclosure may dissolve the corresponding relationship between a certain AR layer and a certain navigation scene at any time, and may also establish the corresponding relationship between a certain AR layer and a certain navigation scene at any time. The mapping relationship may be flexibly established and dissolved with the change of the scene, thereby overcoming the technical problem in the existing technology that the different service functions cannot be displayed for the different navigation scenes. Thus, a multi-channel output in the different navigation scenes may be realized, thus saving the maintenance time and the maintenance cost.

According to a second aspect, the present disclosure in some embodiments further provides an apparatus for displaying AR navigation, the apparatus which can include a recognizing module, a determining module and a displaying module, where:

the recognizing module is configured to recognize a navigation scene at a current moment during an AR navigation;

the determining module is configured to determine, according to a preset mapping relationship between a navigation scene and a service function, a current service function corresponding to the navigation scene at the current moment; and the displaying module is configured to display the current service function corresponding to the navigation scene at the current moment in the navigation scene at the current moment.

In some embodiments, the determining module is configured to determine, according to a preset mapping relationship between the navigation scene and a display device, a current display device corresponding to the navigation scene at the current moment; determine, according to a preset mapping relationship between the display device and an AR layer, a current AR layer corresponding to the current display device; and determine, according to a preset mapping relationship between the AR layer and the service function, the current service function corresponding to the current AR layer.

In some embodiments, the apparatus further includes a setting module, where the setting module is configured to acquire each display device supported by a current system; assign a corresponding root layout to each acquired display device; and add the root layout corresponding to each display device to the display device.

In some embodiments, the setting module is configured to, in response to the navigation scene at the current moment being switched from a first navigation scene to a second navigation scene, dissolve a mapping relationship between a first AR layer corresponding to the first navigation scene and a first display device corresponding to the first navigation scene; and establish a mapping relationship between a second AR layer corresponding to the second navigation scene and a second display device corresponding to the second navigation scene.

According to a third aspect, embodiments of the present disclosure provide an electronic device, including:

one or more processors; and a storage device for storing one or more programs;

where the one or more programs when executed by the one or more processors cause the one or more processors to implement the method for displaying an AR navigation according to any embodiment of the disclosure.

According to a fourth aspect, embodiments of the present disclosure provide a storage medium storing a computer program. The computer program, when executed by a processor, implements a method for displaying AR navigation described in any of the embodiments of the present disclosure.

The above embodiments of the present disclosure have the following advantages or beneficial effects. According to the method and apparatus for displaying AR navigation, the electronic device and the storage medium, the navigation scene at the current moment is first recognized during the AR navigation. Then, according to the preset mapping relationship between the navigation scene and the service function, the current service function corresponding to the navigation scene at the current moment is determined. Next, the current service function corresponding to the navigation scene at the current moment is displayed in the navigation scene at the current moment. That is, the mapping relationship between the navigation scene and the service function may be preset in the present disclosure, and in this way, the different service functions may be displayed for the different navigation scenes. However, in the existing method of displaying the AR navigation, a fixed service function is generally displayed in a fixed application scenario. Since the technical means of presetting the mapping relationship between the navigation scene and the service function is used in the present disclosure, the mapping relationship may be flexibly established and dissolved with the scene, thereby overcoming the technical problem in the existing technology that the different service functions cannot be displayed for the different navigation scenes. Thus, the multi-channel output in the different navigation scenes may be realized, thus saving the maintenance time and the maintenance cost. Moreover, the technical scheme of embodiments of the present disclosure is simple and convenient to implement, convenient to popularize, and applicable to a wider range.

Other effects possessed in the above alternative implementations will be described hereinafter in combination with specific embodiments.

BRIEF DESCRIPTION OF THE DRAWINGS

The accompanying drawings are used to provide a better understanding for the present disclosure, and do not constitute a limitation to the present disclosure. In the drawings.

DETAILED DESCRIPTION OF EMBODIMENTS

Embodiments of the present disclosure are described below in combination with the accompanying drawings, in which various details of embodiments of the present disclosure are included to facilitate understanding, and are to be considered as examples only. Accordingly, those of ordinary skill in the art should recognize that various changes and modifications may be made to embodiments described herein without departing from the scope and spirit of the present disclosure. Also, for clarity and conciseness, descriptions for well-known functions and structures are omitted from the following description.

First Embodiment

Figure 1:
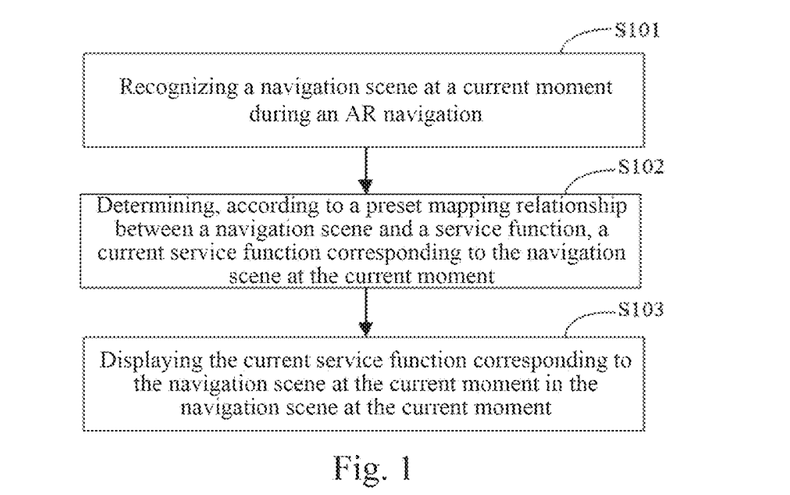
FIG. 1 is a schematic flowchart of a method for displaying an AR navigation provided in a first embodiment of the present disclosure.

FIG. 1 is a schematic flowchart of a method for displaying an AR navigation provided in a first embodiment of the present disclosure. The method may be performed by an apparatus for displaying an AR navigation or an electronic device. The apparatus or the electronic device may be implemented by software and/or hardware, and may be integrated in any smart device having a network communication function. As shown in FIG. 1, the method for displaying an AR navigation may include the following steps.

S101 includes recognizing a navigation scene at a current moment during an AR navigation.

In a specific embodiment of the present disclosure, the electronic device may recognize the navigation scene at the current moment during the AR navigation. The navigation scene may include a navigation scene 1, a navigation scene 2, . . . a navigation Scenario N. Here, N is a natural number greater than or equal to 1. In this step, the electronic device may select, from the navigation scene 1, the navigation scene 2, . . . the navigation scene N, a navigation scene as the navigation scene at the current moment.

S102 includes determining, according to a preset mapping relationship between a navigation scene and a service function, a current service function corresponding to the navigation scene at the current moment.

In a specific embodiment of the present disclosure, the electronic device may determine the current service function corresponding to the navigation scene at the current moment, according to the preset mapping relationship between the navigation scene and the service function. Specifically, the electronic device may first determine, according to a preset mapping relationship between the navigation scene and a display device, a current display device corresponding to the navigation scene at the current moment. Then, the electronic device may determine, according to a preset mapping relationship between the display device and an AR layer, a current AR layer corresponding to the current display device. Next, the electronic device may determine, according to a preset mapping relationship between the AR layer and the service function, the current service function corresponding to the current AR layer. Specifically, the preset mapping relationship between the navigation scene and the display device may be a one-to-one mapping relationship or a one-to-many mapping relationship. The preset mapping relationship between the display device and the AR layer may be a one-to-one mapping relationship or a one-to-many mapping relationship. The preset mapping relationship between the AR layer and the service function may be a one-to-one mapping relationship or a one-to-many mapping relationship. The mapping relationships are not limited here.

S103 includes displaying the current service function corresponding to the navigation scene at the current moment in the navigation scene at the current moment.

In a specific embodiment of the present disclosure, the electronic device may display the current service function corresponding to the navigation scene at the current moment in the navigation scene at the current moment. Here, the service function may include a service function 1, a service function 2, . . . , and a service function M. Here, M is a natural number greater than or equal to 1. For example, the current service functions corresponding to the navigation scene at the current moment are the service function 1 and the service function 2. In this step, the electronic device may display the service function 1 and the service function 2 in the navigation scene at the current moment.

According to a method for displaying AR navigation provided in an embodiment of the present disclosure, the navigation scene at the current moment is first recognized during the AR navigation. Then, according to the preset mapping relationship between the navigation scene and the service function, the current service function corresponding to the navigation scene at the current moment is determined. Next, the current service function corresponding to the navigation scene at the current moment is displayed in the navigation scene at the current moment. That is, the mapping relationship between the navigation scene and the service function may be preset in the present disclosure, and in this way, different service functions may be displayed for different navigation scenes. In the existing method of displaying the AR navigation, a fixed service function is generally displayed in a fixed application scenario. Since the technical means of presetting the mapping relationship between the navigation scene and the service function is used in the present disclosure, the mapping relationship may be flexibly established and dissolved with the scene, thereby overcoming the technical problem in the existing technology that the different service functions cannot be displayed for the different navigation scenes. Thus, the multi-channel output in the different navigation scenes may be realized, thus saving the maintenance time and the maintenance cost. Moreover, the technical scheme of embodiments of the present disclosure is simple and convenient to implement, convenient to popularize, and applicable to a wider range.

Second Embodiment

Figure 2:
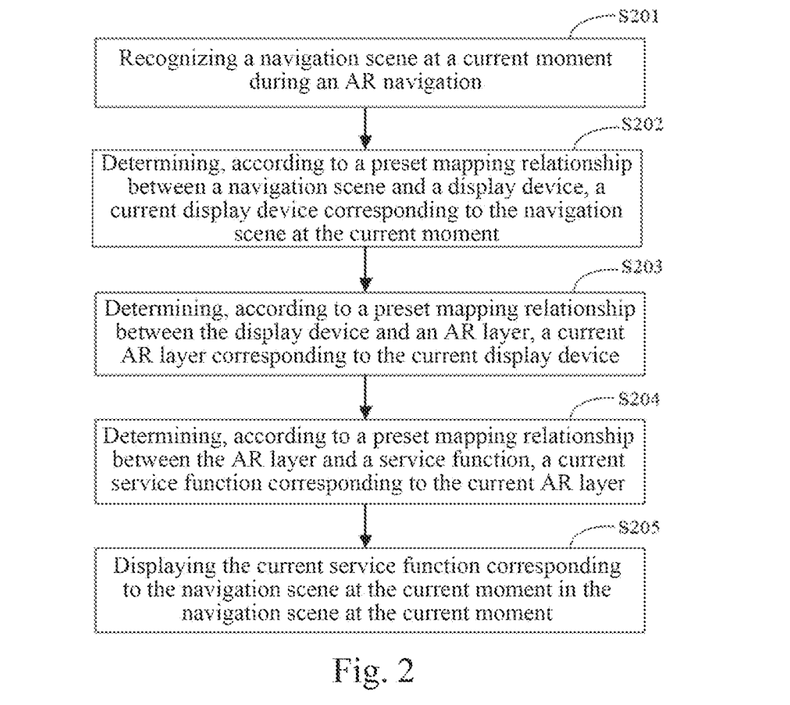
FIG. 2 is a schematic flowchart of a method for displaying an AR navigation provided in a second embodiment of the present disclosure.

FIG. 2 is a schematic flowchart of a method for displaying an AR navigation provided in a second embodiment of the present disclosure. As shown in FIG. 2, the method for displaying an AR navigation may include the following steps.

S201 includes recognizing a navigation scene at a current moment during an AR navigation.

In a specific embodiment of the present disclosure, an electronic device may recognize the navigation scene at the current moment during the AR navigation. Here, the navigation scene may include a navigation scene 1, a navigation scene 2, . . . a navigation Scenario N. Here, N is a natural number greater than or equal to 1. In this step, the electronic device may select, from the navigation scene 1, the navigation scene 2, . . . the navigation scene N, a navigation scene as the navigation scene at the current moment.

Preferably, in a specific embodiment of the present disclosure, before recognizing the navigation scene at the current moment during the AR navigation, the electronic device may first acquire each display device supported by a current system. Then, the electronic device may assign a corresponding root layout to each acquired display device, and add the root layout corresponding to each display device to the display device.

Preferably, in a specific embodiment of the present disclosure, in response to the navigation scene at the current moment being switched from the first navigation scene to the second navigation scene, the electronic device may dissolve a mapping relationship between a first AR layer corresponding to the first navigation scene and a first display device corresponding to the first navigation scene; and then establish a mapping relationship between a second AR layer corresponding to the second navigation scene and a second display device corresponding to the second navigation scene.

S202 includes determining, according to a preset mapping relationship between a navigation scene and a display device, a current display device corresponding to the navigation scene at the current moment.

Figure 3A:
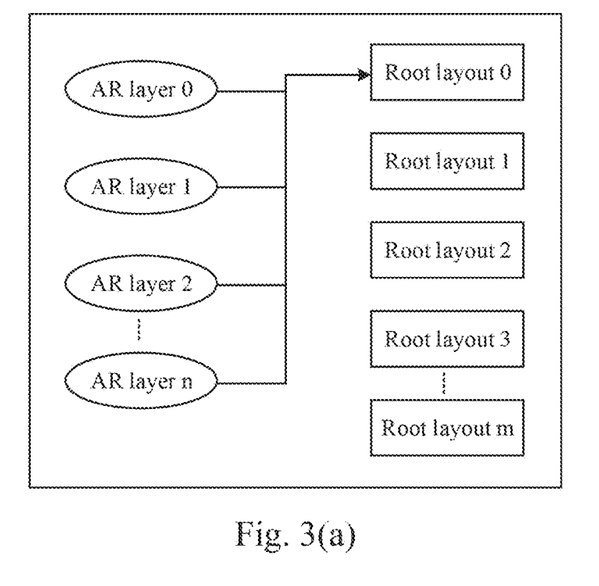
FIG. 3(a) is a mapping relationship between an AR layer and a root layout in a navigation scene 1 provided in the second embodiment of the present disclosure.
Figure 3B:
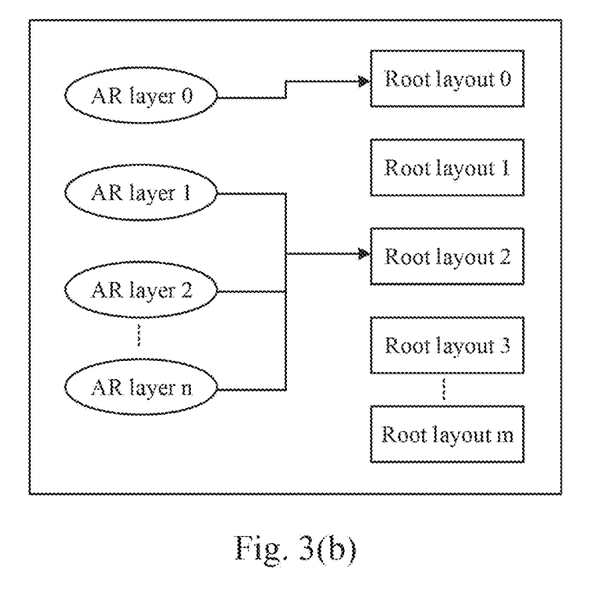
FIG. 3(b) is a mapping relationship between an AR layer and a root layout in a navigation scene 2 provided in the second embodiment of the present disclosure.
Figure 3C:
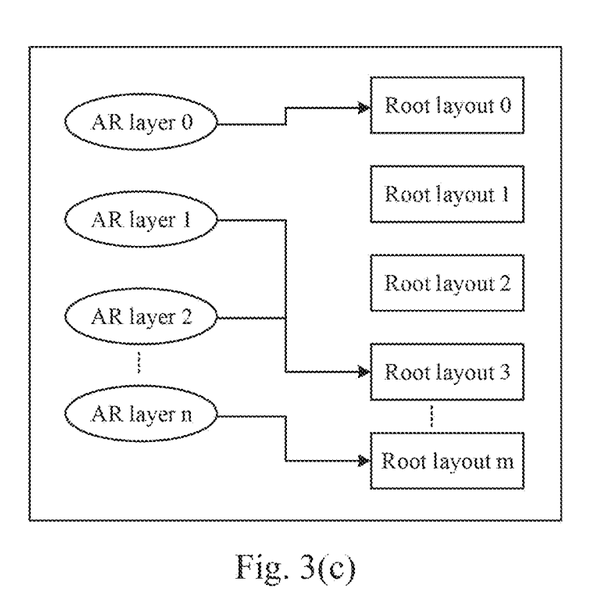
FIG. 3(c) is a mapping relationship between an AR layer and a root layout in a navigation scene 3 provided in the second embodiment of the present disclosure.
Figure 3D:
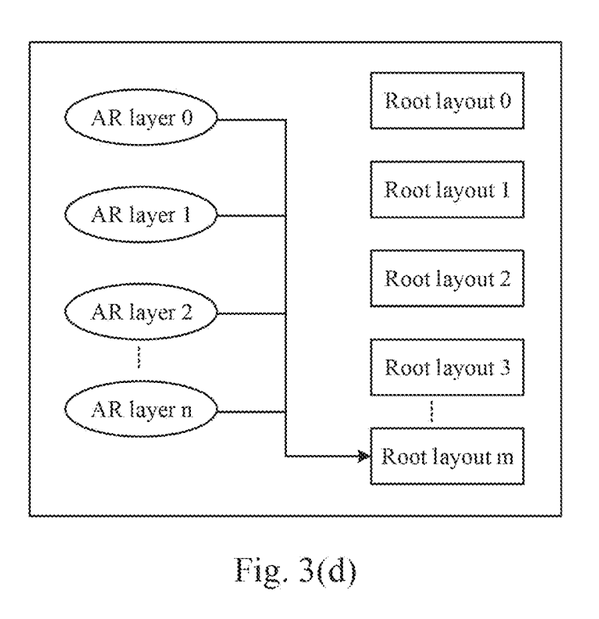
FIG. 3(d) is a mapping relationship between an AR layer and a root layout in a navigation scene 4 provided in the second embodiment of the present disclosure.

In a specific embodiment of the present disclosure, the electronic device may determine the current display device corresponding to the navigation scene at the current moment, according to the preset mapping relationship between the navigation scene and the display device. There is a one-to-one corresponding relationship between a display device and a root layout. For example, a display device 1 corresponds to a root layout 1, a display device 2 corresponds to a root layout 2, and so on. Therefore, there is also a one-to-one or one-to-many mapping relationship between the AR layer and the root layout in the present disclosure. FIG. 3(a) is a mapping relationship between an AR layer and a root layout in the navigation scene 1 provided in the second embodiment of the present disclosure. As shown in FIG. 3(a), an AR layer 0, an AR layer 1, an AR layer 2, . . . , an AR layer n correspond to a root layout 0. Here, n is a natural number greater than or equal to 1. There is no AR layer corresponding to a root layout 1, a root layout 2, a root layout 3, . . . , a root layout m. Here, m is a natural number greater than or equal to 1. FIG. 3(b) is a mapping relationship between an AR layer and a root layout in the navigation scene 2 provided in the second embodiment of the present disclosure. As shown in FIG. 3(b), an AR layer 0 corresponds to a root layout 0, an AR layer 1, an AR layer 2, an AR layer 3 correspond to a root layout 2, and there is no AR layer corresponding to a root layout 1, a root layout 3, a root layout 4, . . . , a root layout m. FIG. 3(c) is a mapping relationship between an AR layer and a root layout in the navigation scene 3 provided in the second embodiment of the present disclosure. As shown in FIG. 3(c), an AR layer 0 corresponds to a root layout 0, an AR layer 1 and an AR layer 2 correspond to a root layout 3, an AR layer n corresponds to a root layout m, and there is no AR layer corresponding to a root layout 1 and a root layout 2. FIG. 3(d) is a mapping relationship between an AR layer and a root layout in the navigation scene 4 provided in the second embodiment of the present disclosure. As shown in FIG. 3(d), an AR layer 0, an AR layer 1, an AR layer 2, . . . , an AR layer n correspond to a root layout m, and there is no AR layer corresponding to a root layout 0, a root layout 1, a root layout 2, a root layout 3, . . . , a root layout m−1

S203 includes determining, according to a preset mapping relationship between the display device and an AR layer, a current AR layer corresponding to the current display device.

In a specific embodiment of the present disclosure, the electronic device may determine the current AR layer corresponding to the current display device, according to the preset mapping relationship between the display device and the AR layer. Here, the preset mapping relationship between the display device and the AR layer may be a one-to-one mapping relationship or a one-to-many mapping relationship.

S204 includes determining, according to a preset mapping relationship between the AR layer and a service function, a current service function corresponding to the current AR layer.

In a specific embodiment of the present disclosure, the electronic device may determine the current service function corresponding to the current AR layer, according to the preset mapping relationship between the AR layer and the service function. Here, the preset mapping relationship between the AR layer and the service function may be a one-to-one mapping relationship or a one-to-many mapping relationship.

Figure 4:
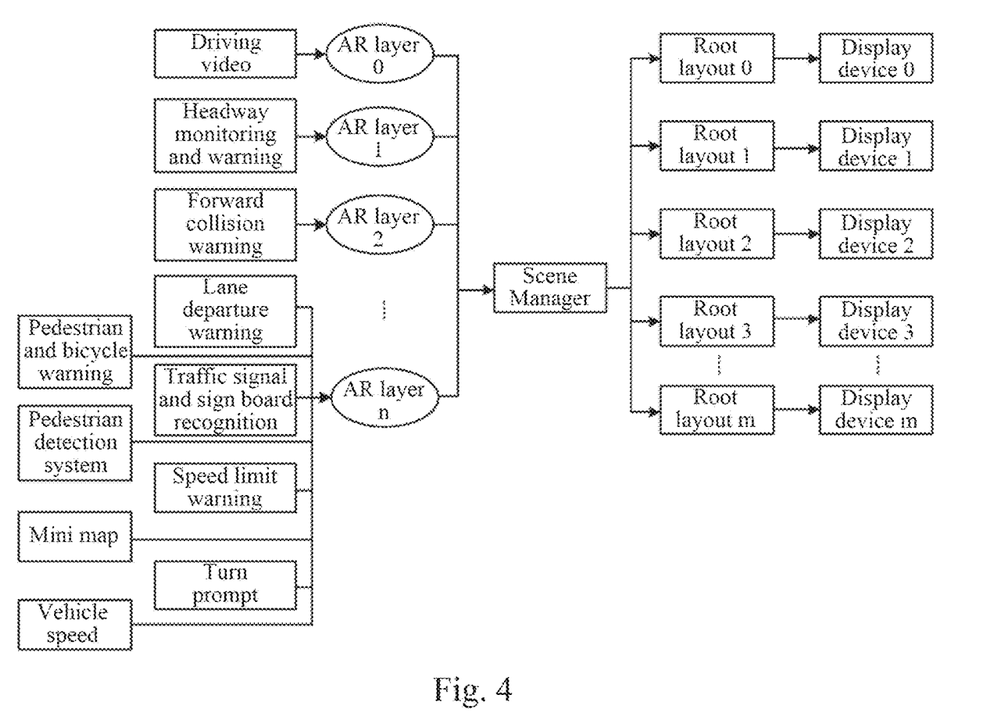
FIG. 4 is a diagram of a multi-channel display structure provided in the second embodiment of the present disclosure.

FIG. 4 is a diagram of a multi-channel display structure provided in the second embodiment of the present disclosure. As shown in FIG. 4, the service function may include a pedestrian collision warning PCW, a pedestrian detection system PDS, a mini map, a vehicle speed, a driving video, a headway monitoring and warning HMW, a forward collision warning FCW, a lane departure warning LDW, road sign recognition RSR, a speed limit indication SLI, and a turn tip. Specifically, the electronic device may set the corresponding relationship between the service function and the AR layer through a scene manager. For example, the driving video corresponds to an AR layer 0, the headway monitoring and warning corresponds to an AR layer 1, the forward collision warning corresponds to an AR layer 2, . . . , the lane departure warning, the pedestrian collision warning, the road sign recognition, the pedestrian detection system, the speed limit indication, the mini map, the turn tip and the vehicle speed correspond to an AR layer n. In addition, the electronic device may also set a corresponding relationship between a root layout Root View and a display device Display through the scene manager. Specifically, a root layout 0 corresponds to a display device 0, a root layout 1 corresponds to a display device 1, a root layout 2 corresponds to a display device 2, . . . , a root layout m corresponds to a display device m. For example, the display device 0 may be a built-in display, the display device 1 may be an HDMI display, the display device 2 may be an HUD display, the display device 3 may be an overlay display, . . . , the display device m may be a virtual display.

S205 includes displaying the current service function corresponding to the navigation scene at the current moment in the navigation scene at the current moment.

In a specific embodiment of the present disclosure, the electronic device may display the current service function corresponding to the navigation scene at the current moment in the navigation scene at the current moment. Here, the service function may include a service function 1, a service function 2, . . . , and a service function M. Here, M is a natural number greater than or equal to 1. For example, the current service functions corresponding to the navigation scene at the current moment are the service function 1 and the service function 2. In this step, the electronic device may display the service function 1 and the service function 2 in the navigation scene at the current moment.

According to a method for displaying AR navigation provided in an embodiment of the present disclosure, the navigation scene at the current moment is first recognized during the AR navigation. Then, according to the preset mapping relationship between the navigation scene and the service function, the current service function corresponding to the navigation scene at the current moment is determined. Next, the current service function corresponding to the navigation scene at the current moment is displayed in the navigation scene at the current moment. That is, the mapping relationship between the navigation scene and the service function may be preset in the present disclosure, and in this way, different service functions may be displayed for different navigation scenes. In the existing method of displaying the AR navigation, a fixed service function is generally displayed in a fixed application scenario. Since the technical means of presetting the mapping relationship between the navigation scene and the service function is used in the present disclosure, the mapping relationship may be flexibly established and dissolved with the scene, thereby overcoming the technical problem in the existing technology that the different service functions cannot be displayed for the different navigation scenes. Thus, the multi-channel output in the different navigation scenes may be realized, thus saving the maintenance time and the maintenance cost. Moreover, the technical scheme of embodiments of the present disclosure is simple and convenient to implement, convenient to popularize, and applicable to a wider range.

Third Embodiment

Figure 5:
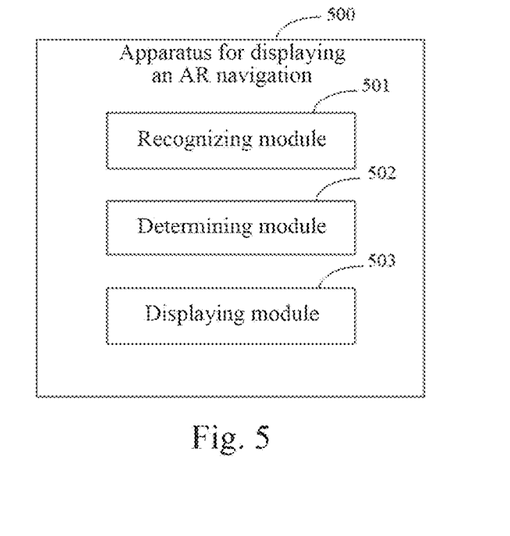
FIG. 5 is a schematic structural diagram of an apparatus for displaying an AR navigation provided in a third embodiment of the present disclosure.

FIG. 5 is a schematic structural diagram of an apparatus for displaying AR navigation provided in a third embodiment of the present disclosure. As shown in FIG. 5, the apparatus 500 includes a recognizing module 501, a determining module 502 and a displaying module 503. Here, the recognizing module 501 is configured to recognize a navigation scene at a current moment during an AR navigation, the determining module 503 is configured to determine, according to a preset mapping relationship between a navigation scene and a service function, a current service function corresponding to the navigation scene at the current moment, and the displaying module 503 is configured to display the current service function corresponding to the navigation scene at the current moment in the navigation scene at the current moment.

Further, the determining module 502 is specifically configured to determine, according to a preset mapping relationship between the navigation scene and a display device, a current display device corresponding to the navigation scene at the current moment; determine, according to a preset mapping relationship between the display device and an AR layer, a current AR layer corresponding to the current display device; and determine, according to a preset mapping relationship between the AR layer and the service function, the current service function corresponding to the current AR layer.

Further, the apparatus further includes a setting module (not shown in the drawings). The setting module is configured to acquire each display device supported by a current system; assign a corresponding root layout to each acquired display device; and add the root layout corresponding to each display device to the display device.

Further, the setting module is configured to dissolve a mapping relationship between a first AR layer corresponding to the first navigation scene and a first display device corresponding to the first navigation scene, in response to the navigation scene at the current moment being switched from a first navigation scene to a second navigation scene; and establish a mapping relationship between a second AR layer corresponding to the second navigation scene and a second display device corresponding to the second navigation scene.

The above apparatus for displaying AR navigation may perform a method provided by any of the embodiments of the present disclosure, and include corresponding function modules performing the method and beneficial effects of performing the method. For the technical details not described in detail in this embodiment, reference may be made to the method for displaying AR navigation provided in any embodiment of the present disclosure.

Fourth Embodiment

According to an embodiment of the present disclosure, the present disclosure further provides an electronic device and a readable storage medium.

Figure 6:
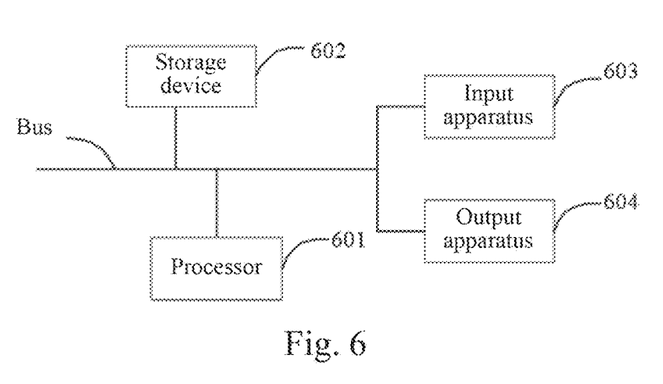
FIG. 6 is a block diagram of an electronic device configured to implement a method for displaying an AR navigation according to embodiments of the present disclosure.

FIG. 6 is a block diagram of an electronic device of a method for displaying AR navigation according to an embodiment of the present disclosure. The electronic device is intended to represent various forms of digital computers such as a laptop computer, a desktop computer, a worktable, a personal digital assistant, a server, a blade server, a mainframe computer, and other suitable computers. The electronic device may also represent various forms of mobile devices such as personal digital processing, a cellular phone, a smart phone, a wearable device and other similar computing apparatuses. The parts shown herein, their connections and relationships, and their functions are only examples, and not intended to limit the implementation of the present disclosure as described and/or claimed herein.

As shown in FIG. 6, the electronic device includes one or more processors 601, a storage device 602, and an interface for connecting parts, which includes a high speed interface and a low speed interface. The various components are interconnected via different buses, and may be mounted on a common motherboard or otherwise as needed. A processor may process an instruction executed within the electronic device, the instruction including an instruction stored in or on the storage device to display graphical information of the GUI on an external input/output apparatus such as a display device coupled to the interface. In other embodiments, a plurality of processors and/or a plurality of buses may be used with a plurality of storage devices, if desired. Also, a plurality of electronic devices may be connected, and each of the devices provides a part of necessary operations, for example, a server array, a set of blade servers, or a multi-processor system. In FIG. 6, one processor 601 is taken as an example.

The storage device 602 is a non-transitory computer readable storage medium provided in the present disclosure.

Here, the storage device stores an instruction executable by at least one processor to cause the at least one processor to perform the method for displaying an AR navigation provided in the present disclosure. The non-transitory computer readable storage medium in the present disclosure stores a computer instruction, and the computer instruction is used to cause a computer to perform the method for displaying an AR navigation provided in the present disclosure.

The storage device 602, as a non-transitory computer readable storage medium, may be configured to store a non-transitory software program, a non-transitory computer executable program and a module, for example, a program instruction/module (e.g., the recognizing module 501, the determining module 502 and the displaying module 503 shown in FIG. 5) corresponding to a method for displaying an AR navigation of any of the embodiments of the present disclosure. The processor 601 executes various functional applications of the server and data processing (i.e., implements the method for displaying an AR navigation in the above embodiments of the method), by running the non-transitory software program, the non-transitory computer executable program and the module.

The storage device 602 may include a storage program area and a storage data area. Here, the storage program area may store an operating system, an application program required by at least one function. The storage data area may store data, etc. created according to the use of the electronic device of the method for displaying an AR navigation. In addition, the storage device 602 may include a high speed random access memory, or may include a non-transitory storage device, for example, at least one magnetic disk storage device, a flash storage device, or other non-transitory solid state storage devices. In some embodiments, the storage device 602 may alternatively include a remotely disposed storage device relative to the processor 601. The remote storage device may be connected to the electronic device of the method for displaying an AR navigation via a network. Examples of the above network include, but not limited to, Internet, an enterprise intranet, a local area network, a mobile communication network, and combinations thereof.

The electronic device of the method for displaying an AR navigation may further include an input apparatus 603 and an output apparatus 604. The processor 601, the storage device 602, the input apparatus 603, and the output apparatus 604 may be connected via a bus or other ways. In FIG. 6, the connection via a bus is taken as an example.

The input apparatus 603 may receive an inputted number or inputted character information, and generate a key signal input related to the user setting and functional control of the electronic device of the method for displaying an AR navigation. For example, the input apparatus is a touch screen, a keypad, a mouse, a track pad, a touch pad, a pointing stick, one or more mouse buttons, a track ball, a joystick, or the like. The output apparatus 604 may include a display device, an auxiliary lighting apparatus (e.g., a light emitting diode (LED), a tactile feedback apparatus (e.g., a vibration motor), or the like. The display device may include, but not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or object-oriented programming language, and/or an assembly/machine language. As used herein, the terms "machine readable medium" and "computer readable medium" refer to any computer program product, device and/or apparatus (e.g., a magnetic disc, an optical disk, a storage device and a Programmable Logic Device (PLD)) used to provide a machine instruction and/or data to the programmable processor, including a machine readable medium that receives the machine instruction used as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT) or an liquid crystal display (LCD) monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a web browser through which the user may interact with the systems and techniques according to the implementations described here) that includes a frontend part, or implemented in a computing system that includes any combination of the backend part, the middleware part, or the frontend part. The parts of the system may be interconnected by any form or medium of digital data communication (e.g., a communication network). Examples of the communication network include a local area network (LAN), a wide area network (WAN), and the Internet.

The computer system may include a client and a server. The client and the server are generally remote from each other and generally interact with each other through the communication network. The relationship between the client and the server is generated through computer programs running on the respective computer and having a client-server relationship to each other.

According to the technical scheme provided in at least some of the embodiments of the present disclosure, a navigation scene at a current moment is first recognized during an AR navigation. Then, according to a preset mapping relationship between a navigation scene and a service function, a current service function corresponding to the navigation scene at the current moment is determined. Next, the current service function corresponding to the navigation scene at the current moment is displayed in the navigation scene at the current moment. That is, the mapping relationship between the navigation scene and the service function may be preset in the present disclosure, and in this way, different service functions may be displayed for different navigation scenes. In the existing method of displaying the AR navigation, a fixed service function is generally displayed in a fixed application scenario. Since the technical means of presetting the mapping relationship between the navigation scene and the service function is used in the present disclosure, the mapping relationship may be flexibly established and dissolved with the scene, thereby overcoming the technical problem in the existing technology that the different service functions cannot be displayed for the different navigation scenes. Thus, a multi-channel output in the different navigation scenes may be realized, thus saving the maintenance time and the maintenance cost. Moreover, technical scheme of embodiments of the present disclosure is simple and convenient to implement, convenient to popularize, and applicable to a wider range.

It should be understood that the processes in various form described above may be arranged in different sequences, and a step may be added to or deleted from the processes. For example, the steps described in the present disclosure may be performed in parallel, sequentially, or in a different sequence. As long as the desired result of the technical scheme disclosed in the present disclosure can be achieved, no limitation is made herein.

The above embodiments do not constitute a limitation to the scope of protection of the present disclosure. It should be appreciated by those skilled in the art that various modifications, combinations, sub-combinations and substitutions may be made depending on design requirements and other factors. Any modifications, equivalents and replacements, and improvements falling within the spirit and the principle of the present disclosure should to be included within the scope of protection of the present disclosure.

What is claimed is:

1. A method for displaying an augmented reality (AR) navigation, comprising:
   recognizing a navigation scene at a current moment during the AR navigation;
   determining, according to a preset mapping relationship between the navigation scene and a service function, a current service function corresponding to the navigation scene at the current moment; and
   displaying the current service function corresponding to the navigation scene at the current moment in the navigation scene at the current moment;
   wherein the method further comprises:
      in response to the navigation scene at the current moment being switched from a first navigation scene to a second navigation scene, dissolving a mapping relationship between a first AR layer corresponding to the first navigation scene and a first display device corresponding to the first navigation scene, and establishing a mapping relationship between a second AR layer corresponding to the second navigation scene and a second display device corresponding to the second navigation scene.

2. The method according to claim 1, wherein the determining, according to a preset mapping relationship between the navigation scene and a service function, a current service function corresponding to the navigation scene at the current moment comprises:
   determining, according to a preset mapping relationship between the navigation scene and a display device, a current display device corresponding to the navigation scene at the current moment;
   determining, according to a preset mapping relationship between the display device and an AR layer, a current AR layer corresponding to the current display device; and
   determining, according to a preset mapping relationship between the AR layer and the service function, the current service function corresponding to the current AR layer.

3. The method according to claim 2, wherein before the recognizing a navigation scene at a current moment during the AR navigation, the method further comprises:
   acquiring each display device supported by a current system;
   assigning a corresponding root layout to the each acquired display device; and
   adding the root layout corresponding to the each display device to the display device;
   wherein the root layout represents a configuration architecture of the display device and is used for associating the display device and the AR layer displayed on the display device.

4. An apparatus for displaying an augmented reality (AR) navigation, comprising:
   at least one processor; and
   a memory storing instructions, wherein the instructions when executed by the at least one processor, cause the at least one processor to perform operations, the operations comprising:
   recognizing a navigation scene at a current moment during the AR navigation,
   determining, according to a preset mapping relationship between the navigation scene and a service function, a current service function corresponding to the navigation scene at the current moment, and
   displaying the current service function corresponding to the navigation scene at the current moment in the navigation scene at the current moment;
   wherein the operations further comprise:
      in response to the navigation scene at the current moment being switched from a first navigation scene to a second navigation scene, dissolving a mapping relationship between a first AR layer corresponding to the first navigation scene and a first display device corresponding to the first navigation scene, and establishing a mapping relationship between a second AR layer corresponding to the second navigation scene and a second display device corresponding to the second navigation scene.

5. The apparatus according to claim 4, wherein, the determining, according to a preset mapping relationship between the navigation scene and a service function, a current service function corresponding to the navigation scene at the current moment comprises:
   determining, according to a preset mapping relationship between the navigation scene and a display device, a current display device corresponding to the navigation scene at the current moment; determining, according to a preset mapping relationship between the display device and an AR layer, a current AR layer corresponding to the current display device; and determining, according to a preset mapping relationship between the AR layer and the service function, the current service function corresponding to the current AR layer.

6. The apparatus according to claim 5, wherein the operations further comprise acquiring each display device supported by a current system; assigning a corresponding root layout to the each acquired display device; and adding the root layout corresponding to the each display device to the display device, wherein the root layout represents a configuration architecture of the display device and is used for associating the display device and the AR layer displayed on the display device.

7. A non-transitory computer readable storage medium, storing a computer instruction, wherein the computer instruction when executed by a processor causes the processor to perform operations, the operations comprising:
   recognizing a navigation scene at a current moment during augmented reality (AR) navigation;
   determining, according to a preset mapping relationship between the navigation scene and a service function, a current service function corresponding to the navigation scene at the current moment; and
   displaying the current service function corresponding to the navigation scene at the current moment in the navigation scene at the current moment;
   wherein the operations further comprise:
      in response to the navigation scene at the current moment being switched from a first navigation scene to a second navigation scene, dissolving a mapping relationship between a first AR layer corresponding to the first navigation scene and a first display device corresponding to the first navigation scene, and establishing a mapping relationship between a second AR layer corresponding to the second navigation scene and a second display device corresponding to the second navigation scene.

8. The storage medium according to claim 7, wherein, the determining, according to a preset mapping relationship between the navigation scene and a service function, a current service function corresponding to the navigation scene at the current moment comprises:
   determining, according to a preset mapping relationship between the navigation scene and a display device, a current display device corresponding to the navigation scene at the current moment; determining, according to a preset mapping relationship between the display device and an AR layer, a current AR layer corresponding to the current display device; and determining, according to a preset mapping relationship between the AR layer and the service function, the current service function corresponding to the current AR layer.

9. The storage medium according to claim 8, wherein the operations further comprise acquiring each display device supported by a current system; assigning a corresponding root layout to the each acquired display device; and adding the root layout corresponding to the each display device to the display device, wherein the root layout represents a configuration architecture of the display device and is used for associating the display device and the AR layer displayed on the display device.

* * * * *